United States Patent [19]

Iu

[11] Patent Number: 4,842,322
[45] Date of Patent: Jun. 27, 1989

[54] VEHICLE WINDOW SUNSHINE SHIELDS DOT

[76] Inventor: Stephen C. Iu, 4537 E. Side, Dallas, Tex. 75226

[21] Appl. No.: 189,214

[22] Filed: May 2, 1988

[51] Int. Cl.⁴ .............................................. B60J 3/06
[52] U.S. Cl. .................... 296/97.7; 248/363; 296/97.9
[58] Field of Search ............... 296/97.7, 97.9, 97.2, 296/97.3; 248/363, 362

[56] References Cited

U.S. PATENT DOCUMENTS

| | | | |
|---|---|---|---|
| 1,158,005 | 10/1915 | Richards, Jr. | 296/97.7 |
| 1,375,164 | 4/1921 | Malott | 296/97 C |
| 1,920,185 | 8/1935 | Carr, Jr. | 296/97.7 |
| 2,632,669 | 3/1953 | Piwczynski | 296/97.7 |
| 2,711,923 | 6/1955 | Parks | 296/97 |
| 2,856,810 | 9/1958 | Frost | 88/1 |
| 3,254,435 | 6/1966 | Rix | 296/97.7 |
| 3,511,365 | 5/1970 | Dow | 296/97.1 |
| 3,954,297 | 5/1976 | Linke et al. | 296/97 |
| 4,179,155 | 12/1979 | Ortiz | 296/97 |
| 4,351,557 | 9/1982 | Chary | 296/97 D |
| 4,727,920 | 3/1988 | Siegler | 160/84 R |

*Primary Examiner*—Robert R. Song
*Attorney, Agent, or Firm*—Warren H. Kitzinger

[57] ABSTRACT

A sunshine dot shield is provided in the form of a circular disc of pliable darkened or colored yet transparent plastic formed integrally with a depressible suction cup at its center whereby the dot shield can be quickly and easily windshield mounted and demounted for reposition mounting conveniently to block direct harsh sunlight radiation from the face of a driver.

14 Claims, 1 Drawing Sheet

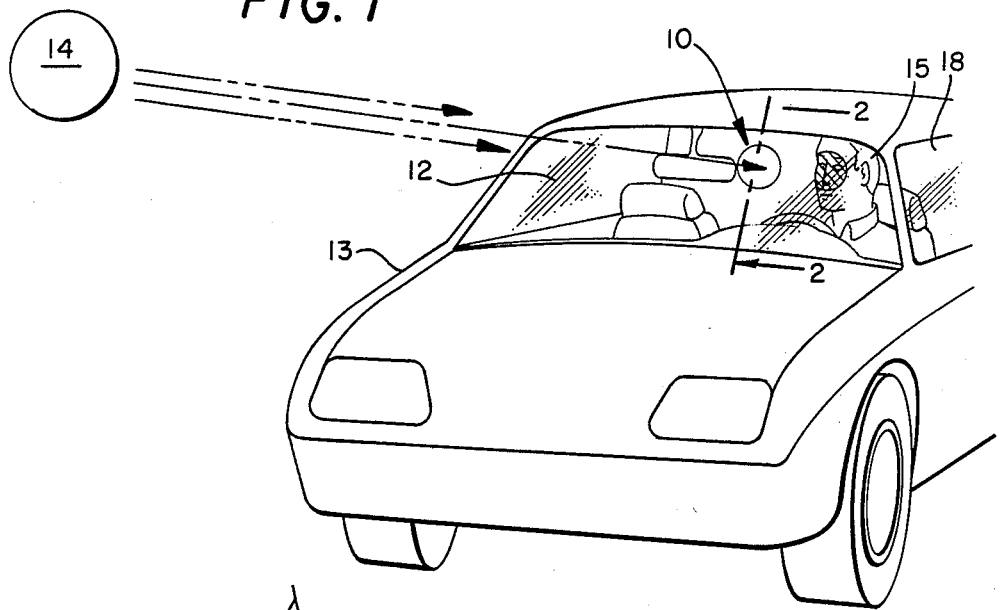
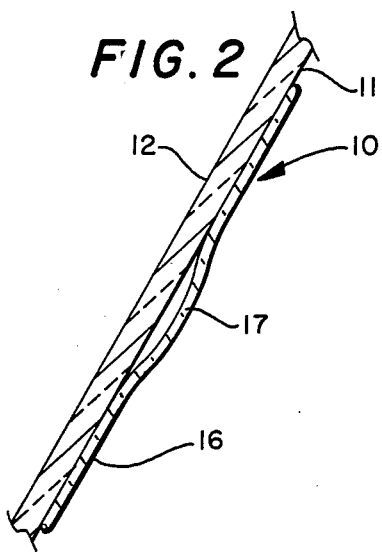
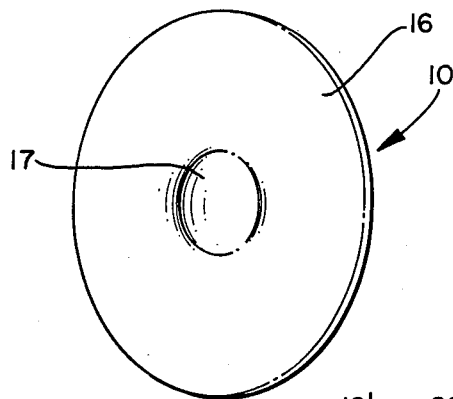
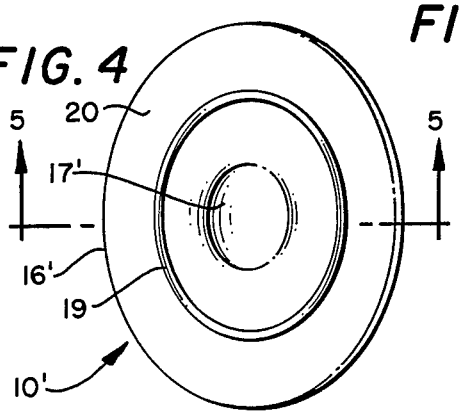
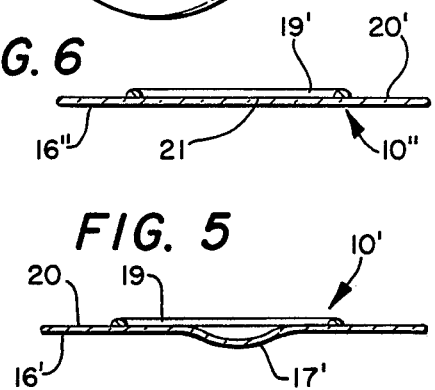
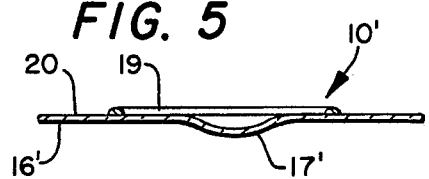

VEHICLE WINDOW SUNSHINE SHIELDS DOT

This invention relates in general to vehicle windshield sun screens and sun shields, and more particularly, to a vehicle window sunshine shield dot that includes a suction cup as an integral part thereof for easy mount positioning of the dot on the inside of a windshield and dismounting as desired.

There are times when a vehicle's sun visor is not adequate to shield a driver's eyes from a low sun such as encountered by those who travel against the sun going to and from work each day. The wearing of sun glasses does not adequately solve the problem since they darken the scene generally and not just direct radiation from the sun. The use of a sunshine shield dot selectively and easily positionable on the inside of a vehicle windshield or a side window to the best position for blocking out screening of the harsh rays from the sun would be most helpful to a driver.

It is, therefore, a principal object of this invention to provide a relatively small sun screen unit that may be moved easily for optimum positioning on the inside of a windshield or side window for blocking out harsh sun radiation from a driver's face.

Another object is to provide such a small sun screen unit that is integrally formed with a suction cup mounting section for easy mounting and dismounting as required.

A further object is to provide such a small sun screen unit that while screening radiation harsh sun radiation is formed of transparent plastic to be transparent throughout the extent thereof.

Still another object is to provide such a sunshine shield easily mountable by pushing the suction portion thereof against the inside of a vehicle window.

Features of the invention useful in accomplishing the above objects include, in a vehicle window sunshine shield dot, a shield dot in the form of a circular disc of pliable darkened or colored yet transparent plastic formed integrally with a depressable suction cup as its center whereby the dot shield can be quickly and easily windshield mounted and demounted for reposition mounting conviently to block direct sunlight radiation from the face of a driver.

Specific embodiments representing what are presently regarded as the best mode of carrying out the invention are illustrated in the accompanying drawing.

In the drawing:

FIG. 1 represents a driver occupied automobile with a sunshine shield dot positioned on the inside of the windshield to block harsh radiation from the sun from the face and eyes of the driver;

FIG. 2, a partial view taken along line 2—2 of FIG. 1 showing the sunshine shield dot mounted in place on the inside surface of a windshield with the suction cup portion thereof somewhat depressed holding the shield dot in place;

FIG. 3, a perspective view of the sunshine shield dot of FIGS. 1 and 2 with the integral suction cup;

FIG. 4, a perspective view of another sunshine shield dot embodiment with an annular ring of pliable transparent plastic on the mounting face of the shield dot as an aid to suction cup mounting of the shield dot;

FIG. 5, a cut away and sectioned view taken along line 5—5 of FIG. 4 showing additional detail of the shield dot embodiment of FIG. 4; and, FIG. 6, a cut away and sectioned view like FIG. 5 of yet another sunshine shield dot embodiment.

Referring to the drawing:

A sunshine shield dot 10 is shown in FIG. 1 to be placed on the inside surface 11 of the windshield 12 of the automobile 13 to be in in the path of harsh intense radiation from the sun 14 to shield the face and eyes of the driver 15 from the brightness of the sun 14. Referring also to FIGS. 2 and 3 the shield dot 10 that is made from a sheet16 of tinted transparent rubbery (or flexible) plastic circular in form in the approximate range of one thirty second to one eighth in thickness and approximately some five to six inches in diameter. The circular dot 10 is mold formed with a suction area cup 17, like a suction cup, at the center of the circular shield dot 10 that is compressible downward forcing air out of the suction area cup 17 that with the resilient set of the plastic material results in suction in the cup 17 holding the shield dot 10 in place where placed on the inside of a windowshield 12 or vehicle side window 18 depending upon orientation of the sun 14 relative to the direction of the automobile 13. Once the sunshine shield dot 10 is placed in a sun 14 shielding position on a window slight variations in automobile 13 orientation may be accomodated by slight movement of the driver's head but with significant change of vehicle 13 direction the shield dot may be quickly and easily peeled away from the window 12 or 18 and repositioned by quick suction cup 17 push on at a presently correct shielding location.

Referring now to the sunshine shield dot 10' embodiment of FIGS. 4 and 5 this dot 10' is very much like the dot 10 of FIGS. 1, 2 and 3 formed from a sheet 16' of tinted plastic circular in form with a suction area cup 17'. The sunshine shield dot 10', however, is provided with an annular ring 19 of relatively soft resilient transparent plastic bonded to the mounting face 20 of the shield dot 10' in annular relation to and around suction cup 17' optimizing sealing of the dot 10' suction cup 17' area through repeated cycles of peel off removal and reposition suction cup 17' mountings on the inside of a vehicle window 12 or 18.

The sunshine shield dot 10'' embodiment of FIG. 6 has a circular sheet 16'' of generally flat tinted transparent plastic with an annular ring 19' of relatively soft resilient transparent plastic bonded to the mounting face 20' of the shield dot 10'' whereby resiliently pushed in deflection of the center area 21 of the circular sheet 16'' inward with the annular ring 19' of plastic engaging the inner surface of a window 12 or 18 forces air out of the chamber within the annular ring 19' against a window surface with a vacuum holding pressure created thereby.

It should be noted that the relatively small size of the various sunshine shield dot embodiments, generally under some seven to eight inches in diameter, makes storage of dots conveniently easy in a glove compartment and/or on the dash board of a vehicle. Further, construction of the shield dots in such that they are so relatively inexpensive that practically any driver can afford to have one.

Whereas this invention has been described with respect to several embodiments thereof, it should be realized that various changes may be made without departure from the essential contributions to the art made by the teachings hereof.

I claim:

1. A sunshine shield dot comprising: a small planar area sheet of dark tinted yet transparent plastic; a resiliently depressible suction cup formed integrally in said sheet of dark tinted yet transparent plastic such that viewing through the sunshine shield dot in the area of said suction cup is not subject to material optical distortion; and with said planar area sheet of dark tinted yet transparent plastic having a maximum transvese dimension less than approximately eight inches.

2. The sunshine shield dot of claim 1, wherein said small planar area sheet is a circular sheet of dark tinted yet transparent plastic.

3. The sunshine shield dot of claim 2, wherein said resiliently depressible suction cup is formed at the transverse center of said circular sheet of dark tinted yet transparent plastic.

4. The sunshine shield dot of claim 3, wherein the diameter of said circular sheet of dark tinted yet transparent plastic falls in the approximate range of five inches to eight inches.

5. The sunshine shield dot of claim 4, wherein said circular sheet of dark tinted yet transparent plastic is in the thickness range of approximately one thirty second of an inch to one eighth of an inch thick.

6. The sunshine shield dot of claim 5, wherein said circular sheet of dark tinted yet transparent plastic is a rubbery like resiliently flexible plastic.

7. A sunshine shield dot comprising: a small planar area sheet of dark tinted yet transparent plastic; a resiliently depressible suction cup formed integrally in said sheet of dark tinted yet transparent plastic; and with said planar area sheet of dark tinted yet transparent plastic having a maximum transverse dimension of less than approximately eight inches; wherein said small planar area sheet is a circular sheet of dark tinted yet transparent plastic; said resiliently depressible suction cup is formed at the transverse center of said circular sheet of dark tinted yet transparent plastic; the diameter of said circular sheet of dark tinted yet transparent plastic falls in the approximate range of five inches to eight inches; said circular sheet of dark tinted yet transparent plastic is in the thickness range of approximately one thirty second of an inch to one eighth of an inch thick; said circular sheet of dark tinted yet transparent plastic is a rubbery like resiliently flexible plastic; and wherein a ring of pliable transparent plastic is bonded to a mounting face of said sunshine shield dot as an aid to suction cup mounting of the shield dot.

8. The sunshine shield dot of claim 7, wherein said ring of pliable transparent plastic is an annular ring of pliable transparent plastic bonded to said mounting face of the shield dot.

9. The sunshine shield dot of claim 8, wherein said depressible suction cup includes a molded suction cup portion in said circular sheet of dark tinted yet transparent plastic along with said annular ring of pliable transparent plastic bonded to said mounting face of the shield dot.

10. The sunshine shield dot of claim 8, wherein said small planar area sheet is planar throughout its extent with said resiliently depressible suction cup formed integrally in said sheet of dark tinted yet transparent plastic is the central area of said small planar area sheet within the bounds defined by said annular ring of pliable transparent plastic bonded to said mounting face of the shield dot.

11. A sunshine shield dot comprising: a small planar area sheet of dark tinted yet transparent plastic; a resiliently depressible suction cup formed integrally in said sheet of dark tinted yet transparent plastic; and with said planar area sheet of dark tinted yet transparent plastic having a maximum transverse dimension less than approximately eight inches; wherein a ring of pliable transparent plastic is bonded to a mounting face of said sunshine shield dot as an aid to suction cup mounting of the shield dot.

12. The sunshine shield dot of claim 11, wherein said ring of pliable transparent plastic is an annular ring of pliable transparent plastic bonded to said mounting face of the shield dot.

13. The sunshine shield dot of claim 12, wherein said depressible suction cup includes a molded suction cup portion in said small planar area sheet of dark tinted yet transparent plastic along with said annular ring of pliable transparent plastic bonded to said mounting face of the shield dot.

14. The sunshine shield dot of claim 12, wherein said small planar area sheet is planar throughout its extent with said resiliently depressible suction cup formed integrally in said sheet of dark tinted yet transparent plastic is the central area of said small planar area sheet within the bounds defined by said annular ring of pliable transparent plastic bonded to said mounting face of the shield dot.

* * * * *